(12) United States Patent
Shigematsu et al.

(10) Patent No.: US 8,035,875 B2
(45) Date of Patent: *Oct. 11, 2011

(54) OBJECT DETECTOR

(75) Inventors: Ryohei Shigematsu, Kanagawa (JP);
Hiroshi Imamura, Kanagawa (JP);
Takafumi Hirata, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/451,910

(22) PCT Filed: Jun. 3, 2008

(86) PCT No.: PCT/JP2008/060195
§ 371 (c)(1),
(2), (4) Date: Dec. 4, 2009

(87) PCT Pub. No.: WO2008/149851
PCT Pub. Date: Dec. 11, 2008

(65) Prior Publication Data
US 2010/0103427 A1 Apr. 29, 2010

(30) Foreign Application Priority Data
Jun. 4, 2007 (JP) ................................. 2007-148198

(51) Int. Cl.
*G02B 26/08* (2006.01)
(52) U.S. Cl. ................ 359/199.3; 359/200.7; 359/224.1
(58) Field of Classification Search .... 359/199.1–199.2, 359/200.7, 224.1–224.2; 250/234–236; 310/36, 310/40 R, 46, 40 MM; 235/462.32–462.38, 235/462.41–462.45
See application file for complete search history.

(56) References Cited

U.S. PATENT DOCUMENTS

| 2001/0036000 A1 | 11/2001 | Nishikawa et al. |
| 2003/0035188 A1 | 2/2003 | Tominaga et al. |
| 2009/0128877 A1 | 5/2009 | Hirata et al. |

FOREIGN PATENT DOCUMENTS

| JP | 03-175390 | 7/1991 |
| JP | 05-040951 | 2/1993 |
| JP | 06-102343 | 4/1994 |
| JP | 6-233515 A | 8/1994 |
| JP | 07-092270 | 4/1995 |
| JP | 2002-174794 | 6/2002 |
| JP | 2006-284954 | 10/2006 |
| WO | WO-02/08818 A1 | 1/2002 |

OTHER PUBLICATIONS

International Search Report and Written Opinion dated Jul. 8, 2008 issued in International Application No. PCT/JP2008/060195. Chinese Office Action for Chinese Patent Application No. 200880018834.8 dated Jun. 29, 2011.

*Primary Examiner* — James Phan
(74) *Attorney, Agent, or Firm* — Edwards Angell Palmer & Dodge LLP

(57) ABSTRACT

An object detector has a light projecting unit that projects light, a light scanning actuator that scans the light, and a light receiving unit. The light scanning actuator includes plate springs, each having a thin-plate shape and one end in a longitudinal direction thereof being fixed; a movable part attached to the other ends in the longitudinal directions of the plate springs; and an electromagnetic driving unit having a magnet that generates a magnetic flux, a yoke that forms a closed magnetic circuit with the magnet and has a part being stacked on the magnet, and a coil held by the movable part and positioned in a gap between the magnet and the yoke such that an aperture plane is substantially orthogonal to a stacking direction of the magnet and the yoke, the electromagnetic driving unit configured to drive the movable part by an electromagnetic force applied to the coil.

7 Claims, 5 Drawing Sheets

OBJECT DETECTOR

TECHNICAL FIELD

The present invention relates to an object detector that detects an object using a light scanning actuator that scans emitted light.

BACKGROUND ART

Conventionally, light scanners that scan light such as laser light have been used in various fields such as radars, scanners, printers, and printing markers. A technique for realizing such light scanners is known, in which a movable mirror is swung or rotated by motor drive, and light from a laser light source is emitted toward the movable mirror to perform scanning by the use of reflected light therefrom as search light (for example, see Patent Documents 1 and 2). Further, another technique is also known, in which light from a laser light source is emitted toward one point where mirror surfaces of a multifaceted mirror rotated by motor drive pass, and light reflected when the respective mirror surfaces pass the point is used for scanning as search light (for example, see Patent Document 3).

Patent Document 1: Japanese Patent Application Laid-open No. H3-175390
Patent Document 2: Japanese Patent Application Laid-open No. H7-92270
Patent Document 3: Japanese Patent Application Laid-open No. H6-102343

DISCLOSURE OF INVENTION

Problem to be Solved by the Invention

However, in the conventional techniques described above, because a bearing is used to rotatably support various mirrors, there is a problem in that noise is generated at the time of operations. Further, the bearing tends to cause time degradation due to frictions or the like, and there is also a problem in durability.

The present invention has been made in view of the above, and an object of the present invention is to provide an object detector that ensures quietness at the time of operations and has excellent durability.

Means for Solving Problem

To solve the above-described problems and achieve the object, an object detector has a light projecting unit that projects light, a light scanning actuator that scans the light projected by the light projecting unit, and a light receiving unit that receives reflected light of the light scanned by the light scanning actuator, to detect presence of an object using the reflected light received by the light receiving unit, wherein the light scanning actuator includes a plurality of plate springs, each plate spring having a thin-plate shape and one end in a longitudinal direction thereof being fixed; a movable part that is attached to the other ends in the longitudinal directions of the plate springs and is capable of moving in accordance with a change in shape of the plate springs; and an electromagnetic driving unit having a magnet that generates a magnetic flux, a yoke that forms a closed magnetic circuit together with the magnet and has a part being stacked on the magnet, and a coil that is held by the movable part and positioned in a gap between the magnet and the yoke such that an aperture plane thereof is substantially orthogonal to a stacking direction of the magnet and the yoke, the electromagnetic driving unit configured to drive the movable part by an electromagnetic force applied to the coil.

In the object detector according to the present invention as set forth in the invention described above, the coil has a flat shape in which a height in a direction orthogonal to the aperture plane is smaller than an arbitrary width in a direction parallel to the aperture plane.

In the object detector according to the present invention as set forth in the invention described above, an optical element that emits light projected by the light projecting unit toward outside is further provided, and the optical element is attached to the movable part.

In the object detector according to the present invention as set forth in the invention described above, the yoke has two arcuate portions having two surfaces each in a semicircular ring shape, the surfaces being opposed in parallel to each other, and the optical element is movable along near an outer edge of the arcuate portions.

In the object detector according to the present invention as set forth in the invention described above, the magnet has a surface in a semicircular ring shape substantially same as the surface of the arcuate portion in the yoke, and the magnet is stacked and fixed on the surface of one of the two arcuate portions opposed to the other arcuate portion.

In the object detector according to the present invention as set forth in the invention described above, the plate springs are arranged in parallel, and in a state in which respective plate springs are not bent, corresponding surfaces thereof pass a same plane and respective longitudinal directions are substantially parallel to each other, and the magnet, the yoke, and the coil are positioned between two of the plate springs that are adjacent to each other.

In the object detector according to the present invention as set forth in the invention described above, the optical element is a mirror, and a surface of the mirror is orthogonal to the longitudinal direction of the plate spring in a state in which the plate spring is not bent.

EFFECT OF THE INVENTION

According to the present invention, the light scanning actuator that scans light projected by the light projecting unit is configured such that the coil, which forms a part of the electromagnetic driving unit that drives the movable part capable of moving with a change in shape of the plurality of plate springs, is positioned in a gap between the magnet and the yoke, both of which also form a part of the electromagnetic driving unit, and the aperture plane of the coil is substantially orthogonal to the stacking direction of the magnet and the yoke. Therefore, the movable part does not come into contact with other members. Accordingly, noise is not generated at the time of light scanning, and time degradation resulting from frictions does not occur. Therefore, quietness at the time of operations can be ensured, and an object detector with excellent durability can be provided.

EXPLANATIONS OF LETTERS OR NUMERALS

Figure 1:
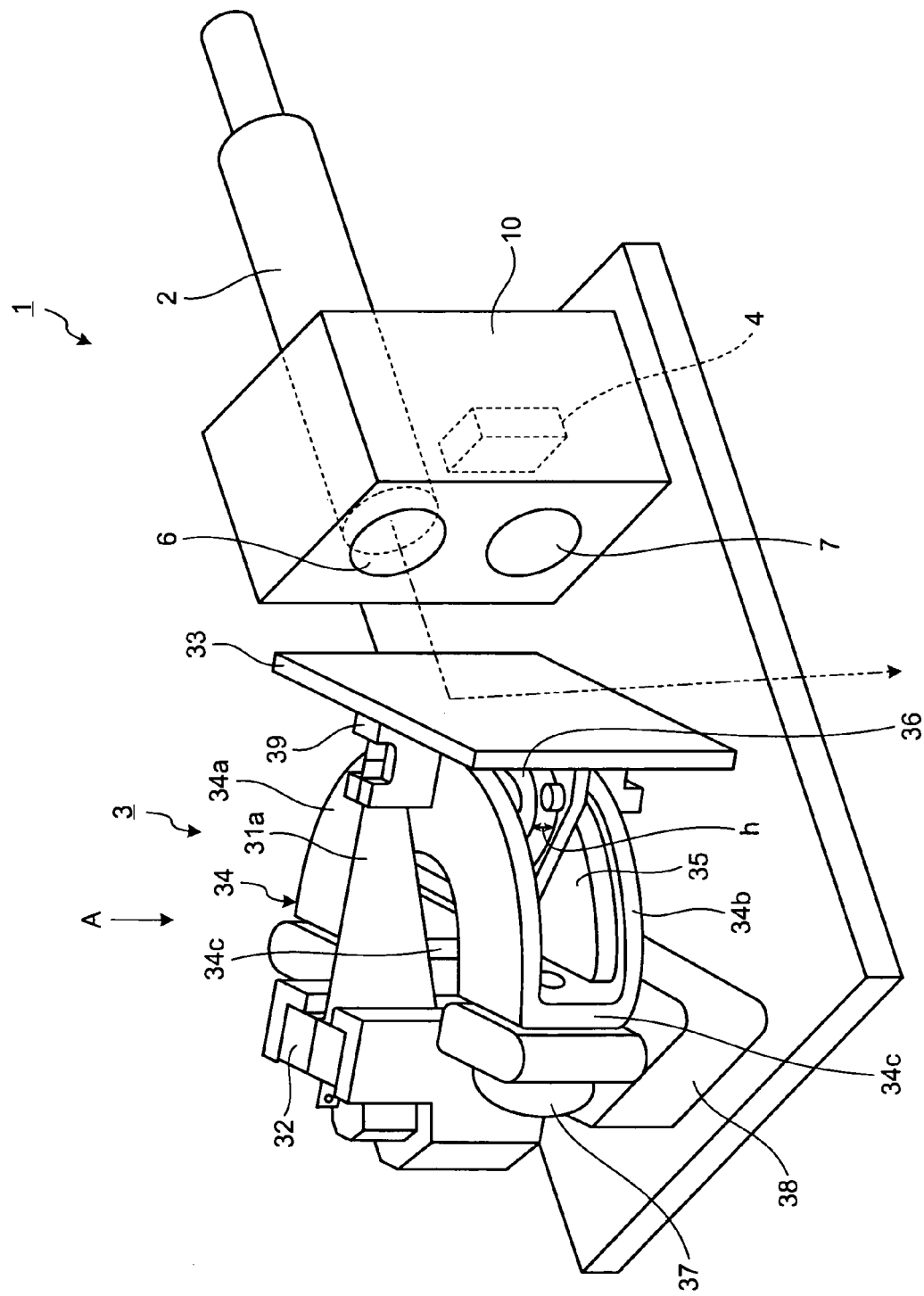
FIG. 1 is a perspective view showing a configuration of relevant parts of an object detector according to an embodiment of the present invention.

1 Object detector
2 Light projecting element
3, 11 light scanning actuator
4 Light receiving element
5 Oscillation circuit
6 Light projecting lens
7 Condenser lens
8 Light receiving circuit
9 Control circuit
10 Holding member
12, 34 Yoke
31a, 31b Plate spring
32 Fixing member
33 Mirror
34a, 34b, 121a, 121b Arcuate portion
34c Coupling portion
35 Magnet
36 Coil
37 Spring member
38 Base member
39 Frame member
39a Plate-spring attaching portion
39b Mirror supporting portion
39c Coil placing portion
40 Displacement detecting unit
311a, 311b Electrode terminal portion
312a, 312b Cutout portion

BEST MODE(S) FOR CARRYING OUT THE INVENTION

Figure 2:
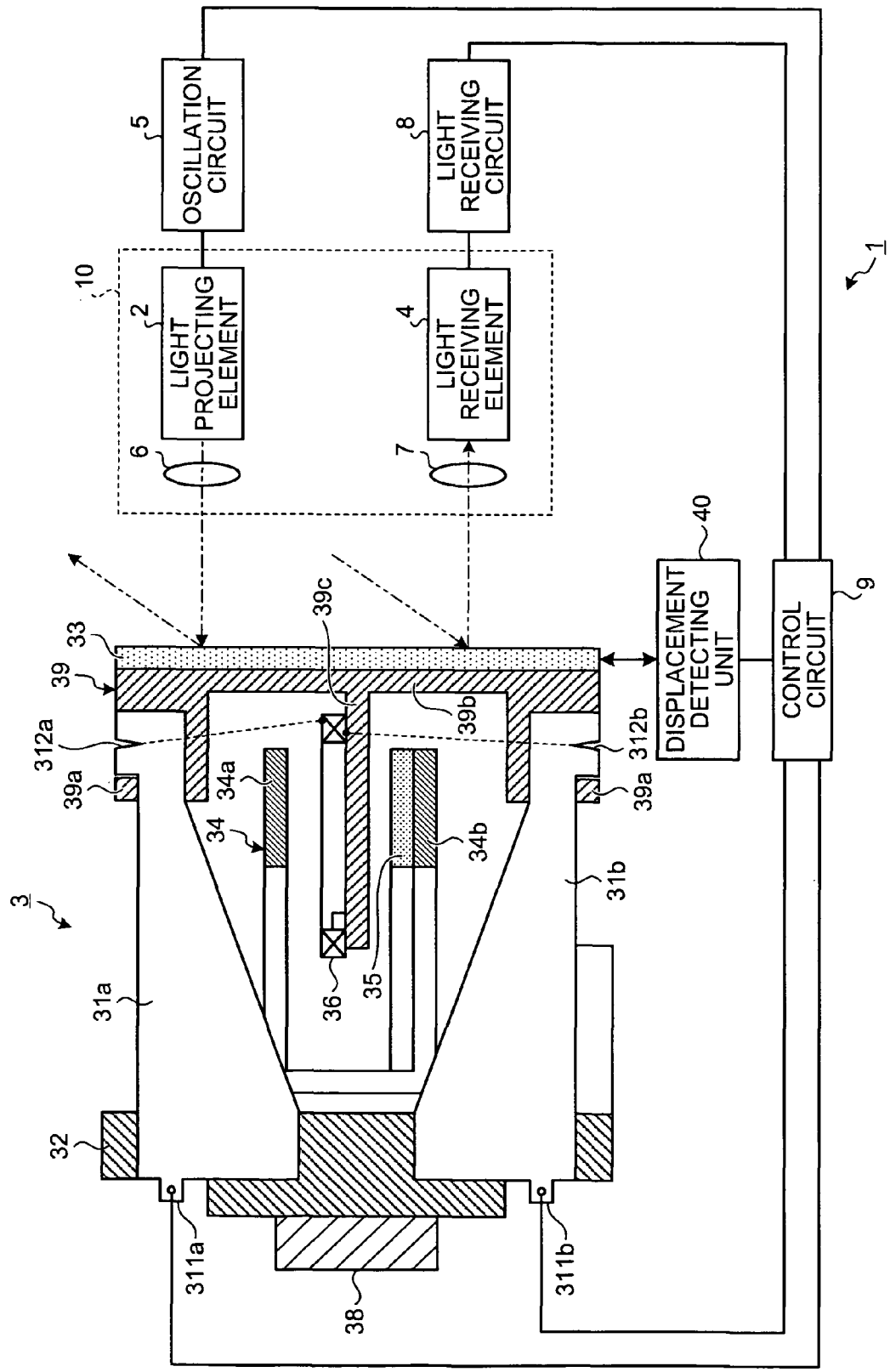
FIG. 2 is a schematic diagram showing a functional configuration of the object detector according to the embodiment of the present invention.

Best modes for carrying out the present invention (hereinafter, "embodiments") will be described below with reference to the accompanying drawings. FIG. 1 depicts a configuration of relevant parts of an object detector according to an embodiment of the present invention. FIG. 2 is a schematic diagram showing a functional configuration of the object detector according to the embodiment. An object detector 1 shown in FIGS. 1 and 2 is an apparatus that detects presence of an object in a predetermined range by scanning light.

The object detector 1 includes a light projecting element 2 that projects light, a light scanning actuator 3 that scans the light projected by the light projecting element 2 and emits reflected light thereof when the scanned light is reflected by an external object, and a light receiving element 4 that receives the reflected light from the object emitted by the light scanning actuator 3. The light projecting element 2 is, for example, a laser diode, and the light receiving element 4 is, for example, a photodiode.

The object detector 1 further includes an oscillation circuit 5 that oscillates the light projecting element 2, a light projecting lens 6 that emits light projected by the light projecting element 2 toward the light scanning actuator 3 as a beam, a condenser lens 7 that condenses the reflected light, which propagates from outside via the light scanning actuator 3, a light receiving circuit 8 that photoelectrically converts and outputs the light received by the light receiving element 4 via the condenser lens 7, a control circuit 9 that controls the light scanning actuator 3, the oscillation circuit 5, and the light receiving circuit 8, and a holding member 10 that accommodates and holds the light projecting element 2 and the light receiving element 4. As shown in FIG. 1, the holding member 10 holds the light projecting element 2 and the light receiving element 4 arranged vertically.

Figure 3:
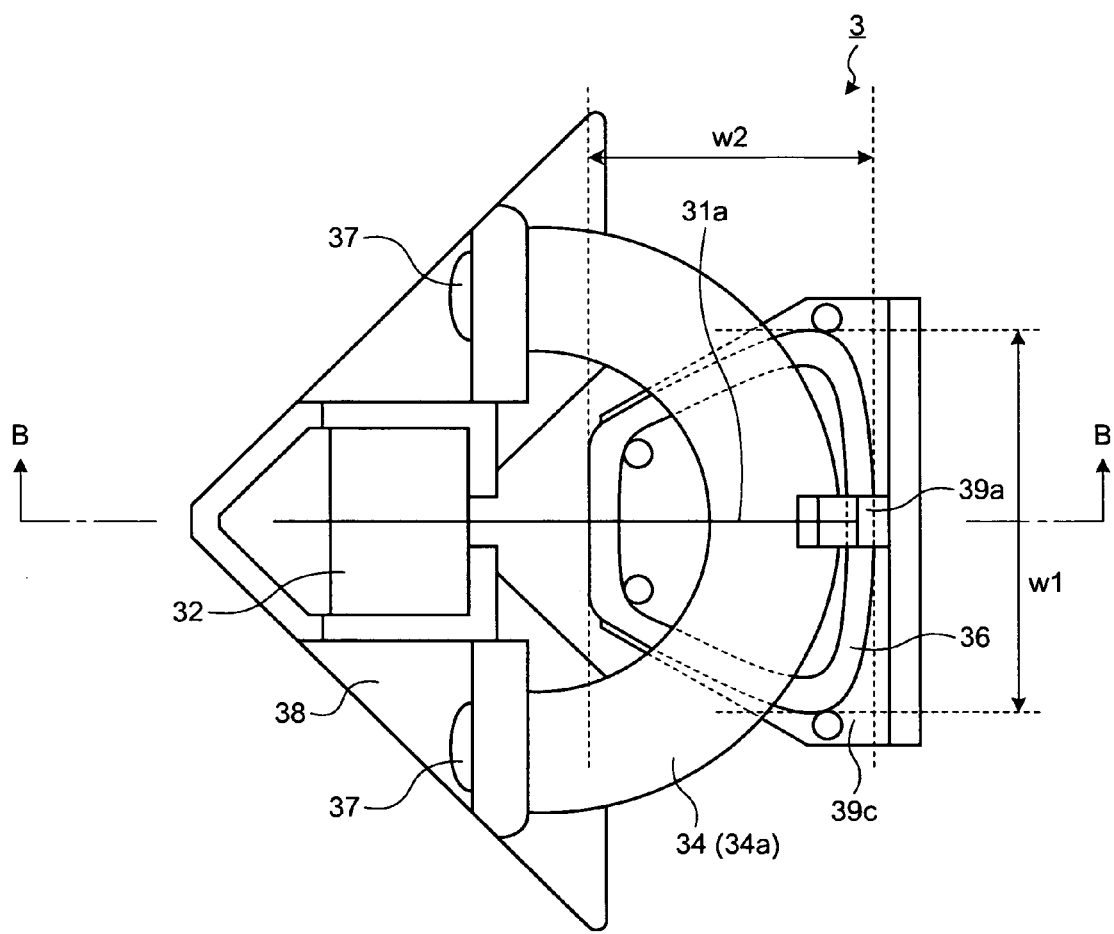
FIG. 3 is a plan view of a light scanning actuator as viewed from an arrow A in FIG. 1.

FIG. 3 depicts a configuration of the light scanning actuator 3 and corresponds to a plan view as viewed from an arrow A in FIG. 1. The light scanning actuator 3 shown in FIG. 2 is as viewed in a cross section along a line B-B in FIG. 3. The light scanning actuator 3 includes two plate springs 31a and 31b, a fixing member 32 that fixes respective base ends of the plate springs 31a and 31b, a mirror 33 as an optical element that reflects incident light projected by the light projecting element 2 and emits reflected light, a yoke 34 and a magnet 35 that form a closed magnetic circuit, a coil 36 arranged in a gap between the yoke 34 and the magnet 35, a base member 38 that holds the fixing member 32 and has the yoke 34 fixedly arranged thereon via a screw member 37, a frame member 39 that forms a movable part capable of moving together with the mirror 33, and a displacement detecting unit 40 that detects a displacement from an initial state (a state where the plate springs 31a and 31b are not bent) at a predetermined position of the light scanning actuator 3.

Both of the plate springs 31a and 31b have the same shape and are arranged in parallel, and in the initial state, corresponding surfaces thereof pass the same plane, and respective longitudinal directions are parallel to each other. Each of the plate springs 31a and 31b has a width gradually narrowing from the base end fixed by the fixing member 32 toward a tip end portion thereof, which is displaceable. Accordingly, a stress distribution of the plate springs 31a and 31b that function as cantilever beams can be made substantially uniform, thereby enabling to efficiently ensure a space for arranging the yoke 34, the magnet 35, and the coil 36. Further, because the plate springs 31a and 31b are arranged to put the yoke 34, the magnet 35, and the coil 36 therebetween in a vertical direction in FIG. 2, rigidity in a direction of swinging the mirror 33 is high, so that it is hardly affected by disturbance.

At the base end of the plate spring 31a, an electrode terminal portion 311a is provided, which protrudes from the base end of the plate spring 31a along a longitudinal direction of the plate spring 31a in the initial state, to attach a wiring for connecting to the control circuit 9 that generates electric current to be flowed to the coil 36. Further, at the other end of the plate spring 31a, a cutout portion 312a is provided, which is cut in a direction substantially orthogonal to the longitudinal direction of the plate spring 31a in the initial state, to ensure conduction between the plate spring 31a and the coil 36 by hooking one end of the coil 36. Similarly to the plate spring 31a, the plate spring 31b has an electrode terminal portion 311b and a cutout portion 312b.

The plate springs 31a and 31b having the configuration described above are respectively connected to the control circuit 9 via a wiring connected to each of the electrode terminal portions 311a and 311b, and also connected to ends of the coil 36 via the cutout portions 312a and 312b, respectively. With this configuration, the control circuit 9 and the coil 36 are electrically connected, thereby causing the electric current to flow to the coil 36. In FIG. 2, connection between an end of a winding of the coil 36 and the cutout portions 312a and 312b is shown by a broken line.

The plate springs 31a and 31b are made of a thin-plate spring material such as beryllium steel, phosphor bronze, or stainless steel, and formed by punching by press machining or etching forming. A polymer sheet having viscoelasticity can be adhered on the surfaces of the plate springs 31a and 31b. With this, an appropriate damping effect relative to the frame member 39 can be provided, unnecessary induction of vibration resulting from breakage of an apparatus itself at the time of resonance or an input of disturbance can be suppressed, and a large braking force does not need to be generated in the coil 36 at a turning point of a swinging movement. Therefore, power saving of the light scanning actuator 3 and excellent responsiveness can be achieved.

The fixing member 32 is formed by injection molding of liquid crystal polymer (LCP) filled with light-weight and highly rigid glass fibers or the like or engineering plastic such as polyphenylene sulfide (PPS).

The mirror 33 is formed using glass, synthetic resin, or light metal such as aluminum, and a surface thereof (mirror surface) is supported by the frame member 39 to be orthogonal to the longitudinal direction of the plate springs 31a and 31b in the initial state. A reflecting layer smoothly formed by a method such as aluminum deposition is provided on the surface of the mirror 33. A protecting layer formed of a thin film of silicon dioxide ($SiO_2$) or the like that protects the surface from corrosion or oxidation is formed on the surface of the reflecting layer.

The yoke 34 has two arcuate portions 34a and 34b having two surfaces each in a semicircular ring shape, the surfaces being opposed in parallel in a separated state, and two coupling portions 34c that couple ends of the arcuate portions 34a and 34b opposed to each other. The yoke has a closed shape as a whole. The coupling portion 34c is fixed to the base member 38 via the screw member 37. The yoke 34 having such a configuration is formed of a soft magnetic material such as pure iron, and forms a closed magnetic circuit together with the magnet 35.

The magnet 35 has a thin-plate shape having a surface of substantially the same shape as the arcuate portions 34a and 34b of the yoke 34. The magnet 35 is fixed to the yoke 34 in a state of being stacked on the surface of the arcuate portion 34b positioned on a lower side and facing to the arcuate portion 34a.

The coil 36 is held by the frame member 39 and positioned in a gap between the arcuate portion 34a of the yoke 34 and the magnet 35. More specifically, the coil 36 is arranged such that the aperture plane thereof is arranged substantially orthogonal to the stacking direction of the yoke 34 and the magnet 35. That is, the coil 36 is arranged at a position where the aperture plane crosses a magnetic flux formed by the yoke 34 and the magnet 35 at a right angle.

The aperture plane of the coil 36 is formed substantially in an isosceles trapezoid, with a short side thereof positioned on an inner circumference side of the arcuate portions 34a and 34b, and a long side thereof positioned on an outer circumference side thereof. By arranging the coil 36 having the aperture plane with such a shape as described above, movement of the frame member 39 on the inner circumference side having a small diameter can be made smooth. Further, by increasing a sectional area on the outer circumference side having a large diameter, a large number of magnetic fluxes can traverse, thereby enabling to generate a driving force required for the movement of the frame member 39.

The coil 36 is in a flat shape in which at least a height (h in FIG. 1) in a direction orthogonal to the aperture plane is smaller than an arbitrary width (for example, w1 and w2 in FIG. 3) in a direction parallel to the aperture plane. Because the coil 36 has a flat shape as described above, the gap between the yoke 34 and the magnet 35 can be decreased, thereby enabling space saving and downsizing.

The yoke 34, the magnet 35, and the coil 36 drive the frame member 39, which forms the movable part, by an electromagnetic force, and they form an electromagnetic driving unit that scans light to be emitted by the mirror 33.

The frame member 39 includes a plate-spring attaching portion 39a, to which the tip end portions of the plate springs 31a and 31b are attached, a mirror supporting portion 39b that supports the mirror 33, and a coil placing portion 39c on which the coil 36 is placed. As shown in FIG. 2, an extending direction (the vertical direction in FIG. 2) of the mirror supporting unit 39b and an extending direction of the coil placing portion 39c (the right and left direction in FIG. 2) are orthogonal to each other. The frame member 39 may be formed using engineering plastic similar to that of the fixing member 32.

When the plate springs 31a and 31b are attached to the fixing member 32 and the frame member 39, the plate springs 31a and 31b can be integrally formed with at least one of the fixing member 32 and the frame member 39, using the plate springs 31a and 31b as an insert material.

In the light scanning actuator 3 having the above configuration, the control circuit 9 causes the electric current to flow to the coil 36, to change the magnetic flux penetrating the aperture plane of the coil 36. As a result, Lorentz's force is generated in the coil 36 in a direction blocking the change of the magnetic flux. The Lorentz's force swings the mirror 33 and the frame member 39 as a driving force of the coil 36. In this case, the electric current caused to flow to the coil 36 is an alternating current with a frequency of about 10 to 100 hertz, for example.

The control circuit 9 controls the electric current flowing to the coil 36 based on the displacement at a predetermined position detected by the displacement detecting unit 40. The displacement detecting unit 40 includes a magnetic sensor such as a Hall IC, to detect the displacement of the plate springs 31a and 31b, the mirror 33, or the frame member 39 from the initial state at the predetermined position, and outputs the detected displacement to the control circuit 9.

Figure 4:
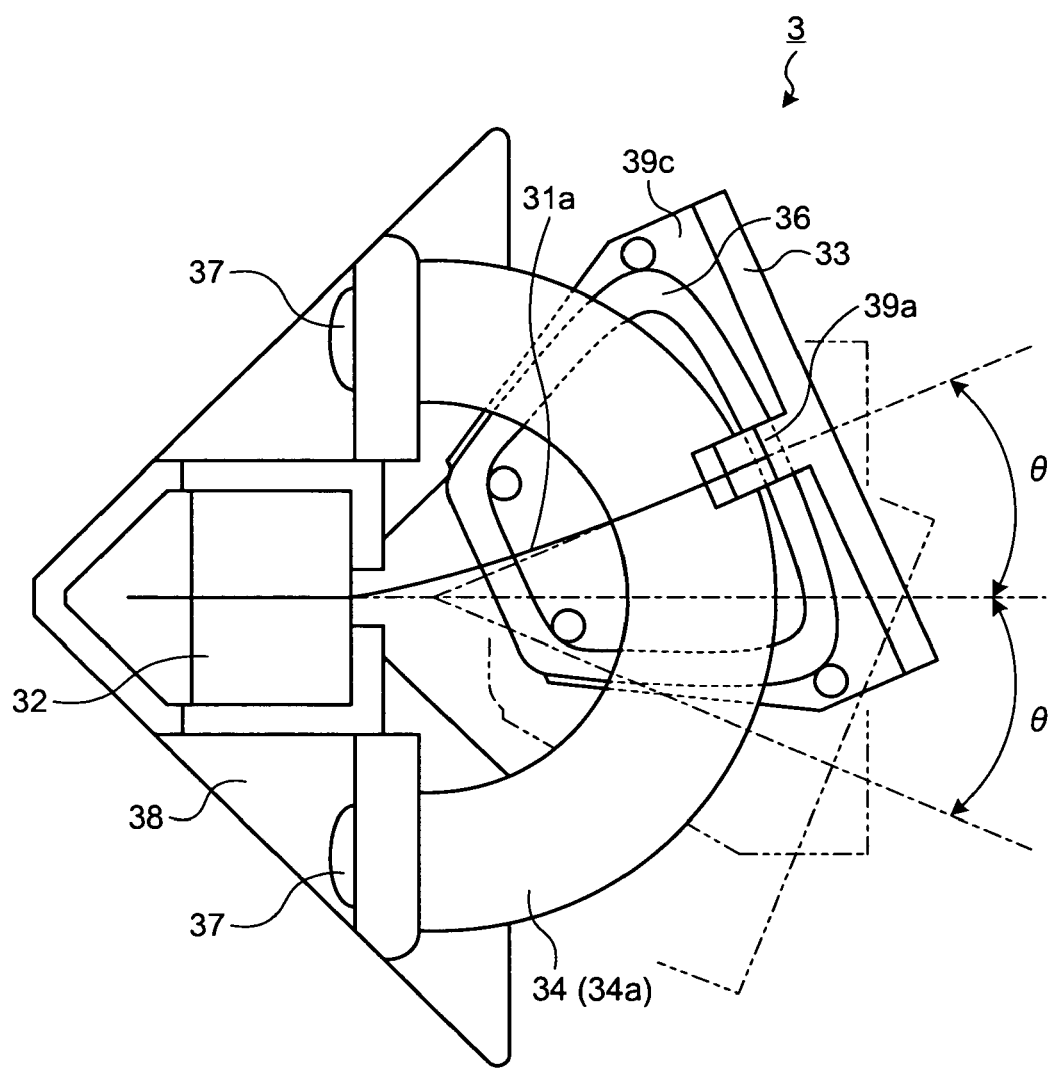
FIG. 4 is an explanatory diagram showing an operation of the light scanning actuator.

FIG. 4 is an explanatory diagram showing an operation of the light scanning actuator 3 and depicts an outline of the swinging movement. In FIG. 4, a case that the plate spring 31a (31b) is bent most and is at one turning point in the swinging movement is shown by a solid line. As shown in FIG. 4, the mirror 33 and the frame member 39 swing with respect to an original position (the horizontal direction in FIG. 4) by an equal angle θ toward upward and downward in FIG. 4. At the time of swinging, the mirror 33 moves along near an outer edge of the arcuate portions 34a and 34b of the yoke 34. For example, if it is assumed that a maximum swing angle θ of the mirror 33 from the original position is θ=22.5 (degrees), the mirror 33 swings in a range of 45 degrees centering on the original position, and a scanning angle of light emitted by the mirror 33 becomes 90 degrees.

In the light scanning actuator 3, the aperture plane of the coil 36 is substantially parallel to the arcuate portions 34a and 34b of the yoke 34 and the surface of the magnet 35, and thus any part of the yoke 34 does not penetrate the aperture plane of the coil 36. Therefore, in the light scanning actuator 3, even if the frame member 39 is retracted toward the fixing member 32 in a wide-angle region having a large swing angle, the coil 36 does not come into contact with the yoke 34. Therefore, the light scanning actuator 3 can accurately scan light even in a wide-angle region, and does not damage the coil 36 and the yoke 34.

According to the embodiment of the present invention described above, the configuration of the light scanning actuator that scans the light projected by the light projecting unit is such that the coil that forms a part of the electromagnetic driving unit that drives the movable part capable of moving with a change in shape of the plurality of plate springs is positioned between the magnet and the yoke that form a part of the electromagnetic driving unit, and the aperture plane thereof is substantially orthogonal to the stacking direction of the magnet and the yoke. Accordingly, the movable part does not come into contact with other members. Therefore, noise is not generated at the time of light scanning, and time degradation resulting from frictions does not occur. Thus, an object detector that can ensure quietness at the time of operations and has excellent durability can be provided.

According to the present embodiment, even if the movable part of the light scanning actuator is moved in a wide range, the coil does not come into contact with the yoke, and the light can be scanned accurately. Therefore, the scanning angle of the light can be a wide angle, and an object detector having the light scanning actuator with excellent durability can be provided.

According to the present invention, because the coil is only arranged in the gap between the magnet and the yoke of the light scanning actuator, a large arranging tolerance of the coil can be provided, and a restriction with respect to the shapes of the yoke and the coil can be smaller than that in a configuration in which the yoke penetrates the coil, thereby increasing the flexibility in design. As a result, the configuration can be simplified, assembly is facilitated with excellent productivity, and the configuration is suitable for downsizing. Particularly, because a rotation motor is not used in the present embodiment, there is little hindrance in downsizing in this respect.

According to the present embodiment, because only one coil is used in the light scanning actuator, a correction unit does not need to be provided for dissolving unbalance of the driving force as in the case of using a plurality of coils, and a mass of the movable part can be reduced. Therefore, the mirror can be driven largely with a small driving force, thereby enabling to realize power saving.

Figure 5:
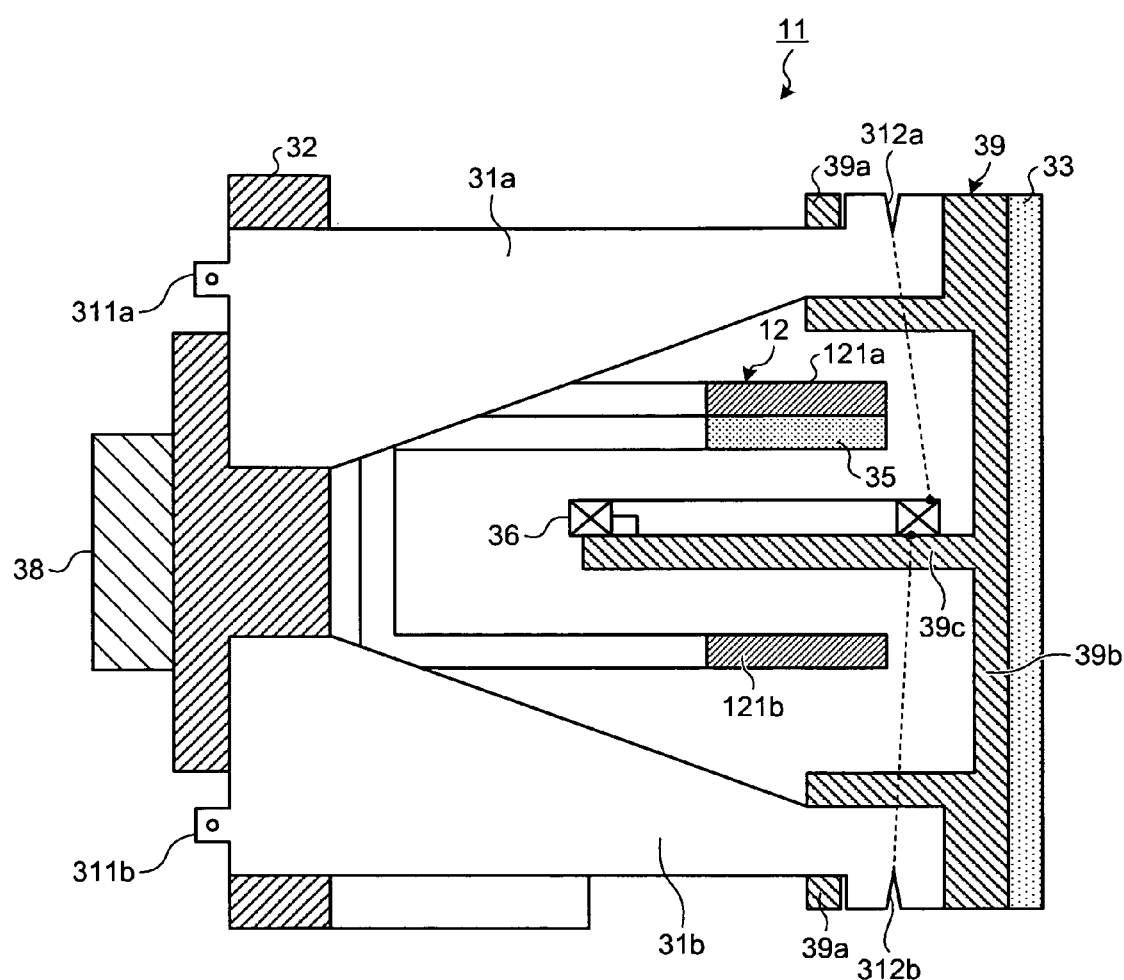
FIG. 5 is another configuration example of the light scanning actuator.

The present invention is not limited to the embodiment described above. FIG. 5 is another configuration example of the light scanning actuator. A light scanning actuator 11 shown in FIG. 5 has the same configuration as that of the light scanning actuator 3 except for a positional relation between a yoke and a magnet. Therefore, in FIG. 5, like reference characters are used for like components in the light scanning actuator 3. Thus, in FIG. 5, elements identical to those of the light scanning actuator 3 are denoted by like reference numerals.

A yoke 12 of the light scanning actuator 11 has substantially the same shape as that of the yoke 34 of the light scanning actuator 3, and includes two arcuate portions 121a and 121b, which are parallel to each other. In this configuration example, the magnet 35 is fixed to the yoke 12 in a state of being stacked on a surface of the upper-side arcuate portion 121a of the two arcuate portions 121a and 121b, the surface being opposed to the lower-side arcuate portion 121b.

An object detector using the light scanning actuator 11 having the above configuration has the same effect as that of the object detector 1 according to the embodiment described above.

In the light scanning actuator applied to the present invention, the shapes of the plate spring, the yoke, the magnet, and the coil are not limited to those described above. Further, as an optical element, a prism or a hologram element can be used instead of the mirror, and a light projecting element itself such as a laser diode can be used. Furthermore, a configuration including three or more plate springs can be applied.

The present invention can include various embodiments or the like not described in this specification, and various design changes or the like can be made without departing from the technical scope defined by the scope of claims.

INDUSTRIAL APPLICABILITY

As described above, the object detector according to the present invention is useful for scanning laser radar devices, laser scanners, laser printers, laser markers, object monitoring apparatuses or the like, and particularly suitable to scanning laser radar devices.

The invention claimed is:

1. An object detector comprising a light projecting unit that projects light, a light scanning actuator that scans the light projected by the light projecting unit, and a light receiving unit that receives reflected light of the light scanned by the light scanning actuator, to detect presence of an object using the reflected light received by the light receiving unit, wherein
the light scanning actuator comprises
a plurality of plate springs, each plate spring having a thin-plate shape and one end in a longitudinal direction thereof being fixed;
a movable part that is attached to the other ends in the longitudinal directions of the plate springs and is capable of moving in accordance with a change in shape of the plate springs; and
an electromagnetic driving unit having a magnet that generates a magnetic flux, a yoke that forms a closed magnetic circuit together with the magnet and has a part being stacked on the magnet, and a coil that is held by the movable part and positioned in a gap between the magnet and the yoke such that an aperture plane thereof is substantially orthogonal to a stacking direction of the magnet and the yoke, the electromagnetic driving unit configured to drive the movable part by an electromagnetic force applied to the coil.

2. The object detector according to claim 1, wherein the coil has a flat shape in which a height in a direction orthogonal to the aperture plane is smaller than an arbitrary width in a direction parallel to the aperture plane.

3. The object detector according to claim 1, further comprising an optical element that emits light projected by the light projecting unit toward outside, wherein
the optical element is attached to the movable part.

4. The object detector according to claim 3, wherein
the yoke has two arcuate portions having two surfaces each in a semicircular ring shape, the surfaces being opposed in parallel to each other, and
the optical element is movable along near an outer edge of the arcuate portions.

5. The object detector according to claim 4, wherein
the magnet has a surface in a semicircular ring shape substantially same as the surface of the arcuate portion in the yoke, and
the magnet is stacked and fixed on the surface of one of the two arcuate portions opposed to the other arcuate portion.

6. The object detector according to claim 3, wherein
the optical element is a mirror, and
a surface of the mirror is orthogonal to the longitudinal direction of the plate spring in a state in which the plate spring is not bent.

7. The object detector according to claim 1, wherein
the plate springs are arranged in parallel, and in a state in which respective plate springs are not bent, corresponding surfaces thereof pass a same plane and respective longitudinal directions are substantially parallel to each other, and
the magnet, the yoke, and the coil are positioned between two of the plate springs that are adjacent to each other.

* * * * *